US012583622B2

(12) United States Patent
Shimomori

(10) Patent No.: US 12,583,622 B2
(45) Date of Patent: Mar. 24, 2026

(54) PASSENGER BOARDING BRIDGE

(71) Applicant: SHINMAYWA INDUSTRIES, LTD.,
Takarazuka (JP)

(72) Inventor: Wataru Shimomori, Takarazuka (JP)

(73) Assignee: SHINMAYWA INDUSTRIES, LTD.,
Takarazuka (JP)

( * ) Notice: Subject to any disclaimer, the term of this
patent is extended or adjusted under 35
U.S.C. 154(b) by 1031 days.

(21) Appl. No.: 17/764,949

(22) PCT Filed: Oct. 30, 2019

(86) PCT No.: PCT/JP2019/042579
§ 371 (c)(1),
(2) Date: Mar. 29, 2022

(87) PCT Pub. No.: WO2021/084650
PCT Pub. Date: May 6, 2021

(65) Prior Publication Data
US 2022/0289402 A1 Sep. 15, 2022

(51) Int. Cl.
*B64F 1/305* (2006.01)

(52) U.S. Cl.
CPC ..................................... *B64F 1/305* (2013.01)

(58) Field of Classification Search
CPC ....................................................... B64F 1/305
USPC .................................................. 14/71.5, 71.1
See application file for complete search history.

(56) References Cited

U.S. PATENT DOCUMENTS

| | | | | | |
|---|---|---|---|---|---|
| 5,855,035 | A | * | 1/1999 | Streeter | B64F 1/305 14/72.5 |
| 7,030,354 | B2 | * | 4/2006 | Oki | B64F 1/305 14/71.1 |
| 7,603,736 | B2 | * | 10/2009 | Hutton | B64F 1/3055 14/71.5 |
| 7,743,445 | B2 | * | 6/2010 | Shen | B64F 1/3055 14/71.3 |
| 8,069,518 | B2 | * | 12/2011 | Saito | B64F 1/305 14/71.5 |
| 2004/0187234 | A1 | * | 9/2004 | Hutton | B64F 1/3055 14/71.5 |

(Continued)

FOREIGN PATENT DOCUMENTS

| | | |
|---|---|---|
| EP | 3814227 B1 | 3/2023 |
| JP | 201839310 A | 3/2018 |

*Primary Examiner* — Raymond W Addie
(74) *Attorney, Agent, or Firm* — Alleman Hall LLP

(57) ABSTRACT

Provided is a passenger boarding bridge that includes: a
rotunda connected to a terminal building and supported in a
horizontally rotatable manner; a tunnel unit whose proximal
end is connected to the rotunda, the tunnel unit being
extendable and retractable; a travel device that supports the
tunnel unit and includes travel wheels, the travel device
being configured such that a travel direction of forward
travel of the travel wheels and a travel direction of backward
travel of the travel wheels are changeable; a cab provided at
a distal end of the tunnel unit, the cab being configured to be
docked with an aircraft; and a determiner configured to, at
a time before undocking the cab docked with the aircraft
from the aircraft, perform determination whether or not the
travel direction of the backward travel of the travel wheels
at the time is a direction within a smooth undocking range.

11 Claims, 5 Drawing Sheets

(56) References Cited

U.S. PATENT DOCUMENTS

| 2015/0353207 | A1* | 12/2015 | Cox | ......................... | B64F 1/22 |
| | | | | | 14/71.1 |
| 2018/0371712 | A1* | 12/2018 | Glatfelter | .............. | B64F 1/3055 |
| 2021/0253271 | A1 | 8/2021 | Merino et al. | | |

* cited by examiner

PASSENGER BOARDING BRIDGE

TECHNICAL FIELD

The present invention relates to a passenger boarding bridge.

BACKGROUND ART

At an airport, a passenger boarding bridge that connects between a terminal building and an aircraft is often used for boarding onto and disembarking from the aircraft (see Patent Literature 1, for example).

Patent Literature 1 describes moving a passenger boarding bridge from a standby position to a predetermined target position, and undocking and moving the passenger boarding bridge from an aircraft to the standby position, by automatic control and/or manual control.

For example, the passenger boarding bridge includes: a rotunda connected to an entrance of a terminal building and supported in a horizontally rotatable manner; a tunnel unit whose proximal end is connected to the rotunda, the tunnel unit including a plurality of tunnels that are fitted together in a telescopic manner, such that the tunnel unit is extendable and retractable; a cab rotatably provided at the distal end of the tunnel unit and docked with an entrance (door) of the aircraft; and drive columns provided at the distal side of the tunnel unit, the drive columns serving as support legs. The drive columns include a lifting/lowering device and a travel device. The lifting/lowering device moves the tunnel unit upward/downward. The travel device is provided below the lifting/lowering device. The travel device includes a pair of travel wheels, each of which can be independently driven to rotate in regular and reverse directions. The travel device is configured to travel forward, travel backward, and change the travel direction, by the driving of the travel wheels.

CITATION LIST

Patent Literature

PTL1: Japanese Laid-Open Patent Application Publication No. 2018-39310

SUMMARY OF INVENTION

Technical Problem

Currently, it is often the case that docking the passenger boarding bridge configured as above with an aircraft and undocking the passenger boarding bridge from the aircraft are manually controlled by operations performed by an operator. Usually, in the case of docking the passenger boarding bridge with the aircraft, the operator performs operations to cause the travel device to travel forward, thereby docking the distal-end cab of the passenger boarding bridge with the door of the aircraft. Then, in the case of undocking the passenger boarding bridge from the aircraft, the operator performs operations to cause the travel device to travel backward, thereby undocking and returning the passenger boarding bridge to a predetermined standby position.

In the above cases where the docking and undocking are controlled by operations performed by the operator, the docked state of the passenger boarding bridge with the aircraft depends on the skill of the operator. Some operator may dock the cab with the aircraft by backward travel of the travel device. In such a case, in order to undock the passenger boarding bridge from the aircraft, the operator needs to cause the travel device to travel forward. However, there may be a case where the undocking operation is performed by an operator different from the operator for the previous docking operation. In such a case, at the time of undocking, if the operator is unaware of the current state (i.e., current docked state), there is a risk that the operator causes the travel device to travel backward as he or she would do so in normal undocking, and as a result, the undocking from the aircraft is hindered.

The present invention has been made to solve the above-described problems. An object of the present invention is to provide a passenger boarding bridge that makes it possible to eliminate a hindrance to undocking of the passenger boarding bridge from an aircraft.

Solution to Problem

In order to achieve the above object, a passenger boarding bridge according to one aspect of the present invention includes: a rotunda connected to a terminal building and supported in a horizontally rotatable manner; a tunnel unit whose proximal end is connected to the rotunda, the tunnel unit being extendable and retractable; a travel device that supports the tunnel unit and includes travel wheels configured to travel forward and backward, the travel device being configured such that a travel direction of forward travel of the travel wheels and a travel direction of backward travel of the travel wheels are changeable; a cab provided at a distal end of the tunnel unit, the cab being configured to be docked with an aircraft; and a determiner configured to, at a time before undocking the cab docked with the aircraft from the aircraft, perform determination whether or not the travel direction of the backward travel of the travel wheels at the time is a direction within a smooth undocking range.

According to the above configuration, before undocking the cab from the aircraft, the determiner determines whether or not the travel direction of the backward travel of the travel wheels is a direction within the smooth undocking range. Accordingly, by changing the method of undocking the cab from the aircraft in accordance with a result of the determination performed by the determiner, a hindrance to the undocking from the aircraft can be eliminated.

In a case where, in a plan view, an angle formed by an axis of the travel wheels, the angle being calculated clockwise with respect to a center line of the tunnel unit before undocking the cab from the aircraft, is an angle Wr, and in the plan view, an angle obtained by adding 90 degrees to an angle that is formed by a tangent line and that is calculated clockwise with respect to the center line of the tunnel unit before undocking the cab from the aircraft is an angle Wt, the tangent line extending horizontally and touching a cab-docked part of the aircraft, the determiner may be configured to perform the determination whether or not the travel direction of the backward travel of the travel wheels is a direction within the smooth undocking range based on whether or not the angle Wr is within an angle range that is set based on predetermined information within a range less than the angle Wt.

In a case where, in a plan view, an angle formed by an axis of the travel wheels, the angle being calculated clockwise with respect to a center line of the tunnel unit before undocking the cab from the aircraft, is an angle Wr, and in the plan view, an angle obtained by adding 90 degrees to an angle that is formed by a straight line and that is calculated clockwise with respect to the center line of the tunnel unit before undocking the cab from the aircraft is an angle Wt, the straight line extending along a distal end edge of the cab, the determiner may be configured to perform the determination whether or not the travel direction of the backward travel of the travel wheels is a direction within the smooth undocking range based on whether or not the angle Wr is within an angle range that is set based on predetermined information within a range less than the angle Wt.

In a case where, in a plan view, an angle formed by an axis of the travel wheels, the angle being calculated clockwise with respect to a center line of the tunnel unit before undocking the cab from the aircraft, is an angle Wr, and in the plan view, an angle obtained by adding 90 degrees to an angle that is formed by a fuselage guide line on an apron and that is calculated clockwise with respect to the center line of the tunnel unit before undocking the cab from the aircraft is an angle Wt, the determiner may be configured to perform the determination whether or not the travel direction of the backward travel of the travel wheels is a direction within the smooth undocking range based on whether or not the angle Wr is within an angle range that is set based on predetermined information within a range less than the angle Wt.

In a case where, in a plan view, an angle formed by an axis of the travel wheels, the angle being calculated clockwise with respect to a center line of the tunnel unit before undocking the cab from the aircraft, is an angle Wr, and in the plan view, an angle obtained by adding 90 degrees to an angle that is formed by an aircraft axis line of the aircraft and that is calculated clockwise with respect to the center line of the tunnel unit before undocking the cab from the aircraft is an angle Wt, the determiner may be configured to perform the determination whether or not the travel direction of the backward travel of the travel wheels is a direction within the smooth undocking range based on whether or not the angle Wr is within an angle range that is set based on predetermined information within a range less than the angle Wt.

The predetermined information may be information about an angle range that is excluded from the range less than the angle Wt and that is preset in accordance with an aircraft type of the aircraft.

The smooth undocking range may be an angle range that is, in a plan view, not less than 90 degrees as calculated clockwise with respect to a center line of the tunnel unit before undocking the cab from the aircraft, and is, in the plan view, set based on predetermined information within a range less than an angle that is obtained by adding 180 degrees to one of the following angles: an angle that is formed by a tangent line and that is calculated clockwise with respect to the center line of the tunnel unit before undocking the cab from the aircraft, the tangent line extending horizontally and touching a cab-docked part of the aircraft; an angle that is formed by a straight line and that is calculated clockwise with respect to the center line of the tunnel unit before undocking the cab from the aircraft, the straight line extending along a distal end edge of the cab; an angle that is formed by a fuselage guide line on an apron and that is calculated clockwise with respect to the center line of the tunnel unit before undocking the cab from the aircraft; and an angle that is formed by an aircraft axis line of the aircraft and that is calculated clockwise with respect to the center line of the tunnel unit before undocking the cab from the aircraft.

The determiner may be configured to perform the determination when an undocking command is inputted. The travel device may be configured to: in a case where a result of the determination performed by the determiner indicates that the travel direction of the backward travel of the travel wheels is a direction within the smooth undocking range, perform automatic travel in which the travel device travels backward by a predetermined distance without changing a facing direction of the travel wheels and then travels backward to a predetermined standby position; and in a case where the result of the determination performed by the determiner indicates that the travel direction of the backward travel of the travel wheels is not a direction within the smooth undocking range, not perform the automatic travel. The passenger boarding bridge may further include a warning unit configured to perform warning in the case where the result of the determination performed by the determiner indicates that the travel direction of the backward travel of the travel wheels is not a direction within the smooth undocking range.

According to the above configuration, in the case where the result of the determination performed by the determiner when the undocking command is inputted indicates that the travel direction of the backward travel of the travel wheels is a direction within the smooth undocking range, the travel device can be caused to perform automatic travel to the standby position. On the other hand, in the case where the result of the determination performed by the determiner indicates that the travel direction of the backward travel of the travel wheels is not a direction within the smooth undocking range, the travel device is not caused to perform the automatic travel, but instead the warning unit performs warning so that an operator will perform manual operation, while paying attention to safety, to undock the cab from the aircraft and cause the travel device to travel to the standby position.

Advantageous Effects of Invention

The present invention is configured as described above, and has an advantage of being able to provide a passenger boarding bridge that makes it possible to eliminate a hindrance to undocking of the passenger boarding bridge from an aircraft.

The above object, other objects, features, and advantages of the present invention will be made clear by the following detailed description of preferred embodiments with reference to the accompanying drawings.

DESCRIPTION OF EMBODIMENTS

Figure 1:
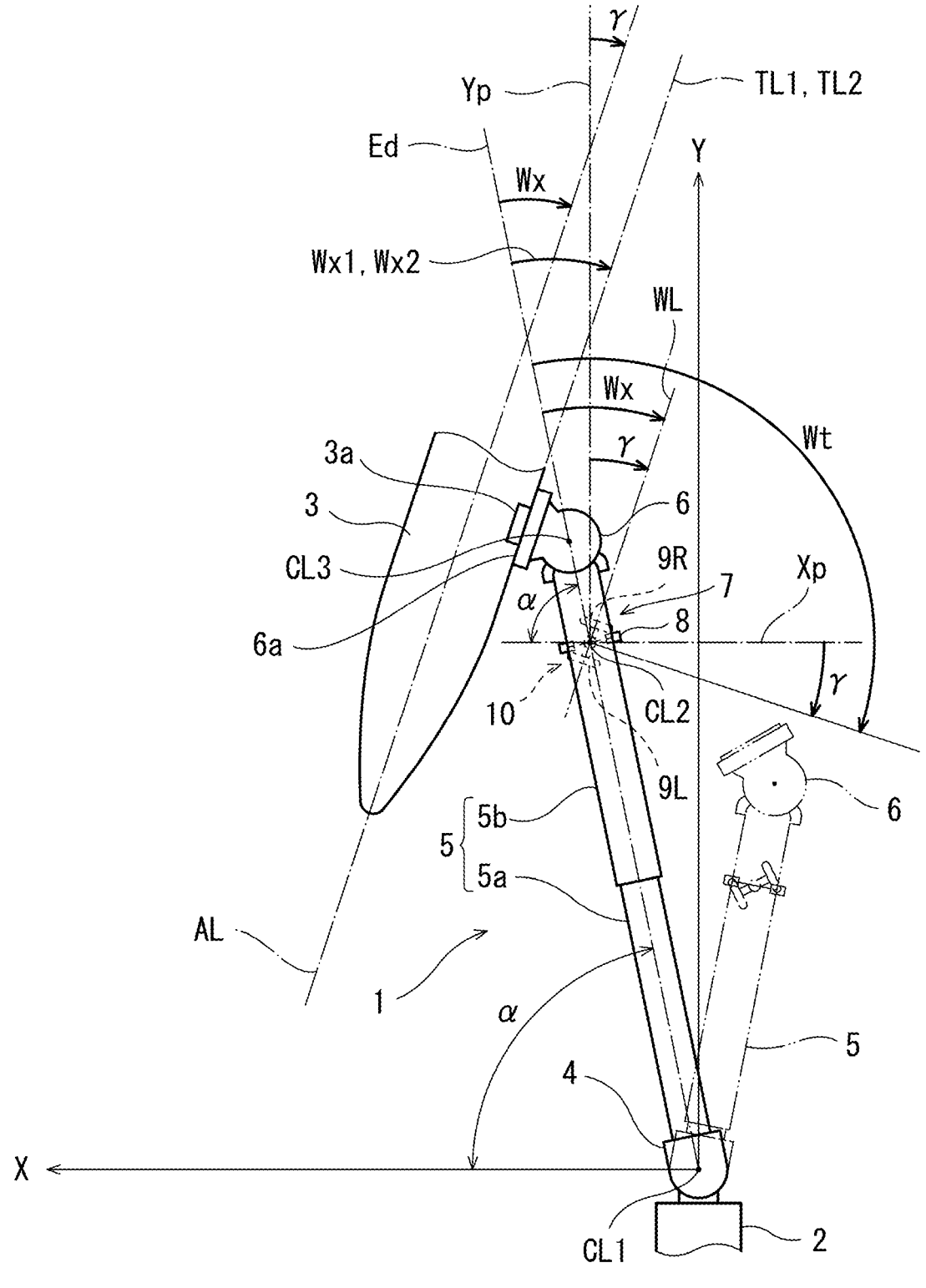
FIG. 1 is a schematic plan view showing one example of a passenger boarding bridge according to an embodiment of the present invention.

Hereinafter, preferred embodiments of the present invention are described with reference to the drawings. In the drawings, the same or corresponding elements are denoted by the same reference signs, and repeating the same descriptions is avoided below. The present invention is not limited to the embodiments described below.

Embodiment

Figure 2:
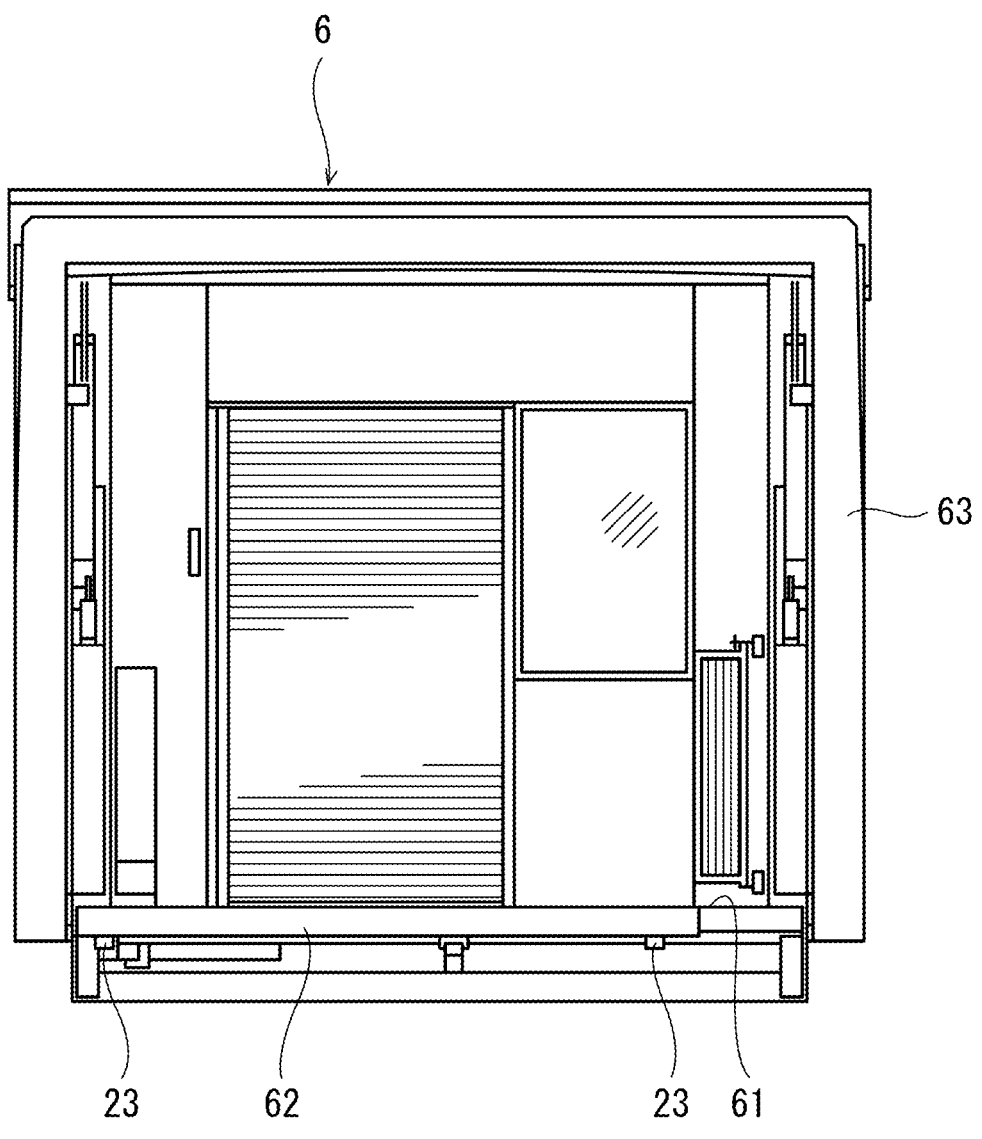
FIG. 2 is a front view of the distal end part of a cab to be docked with an aircraft.
Figure 3:
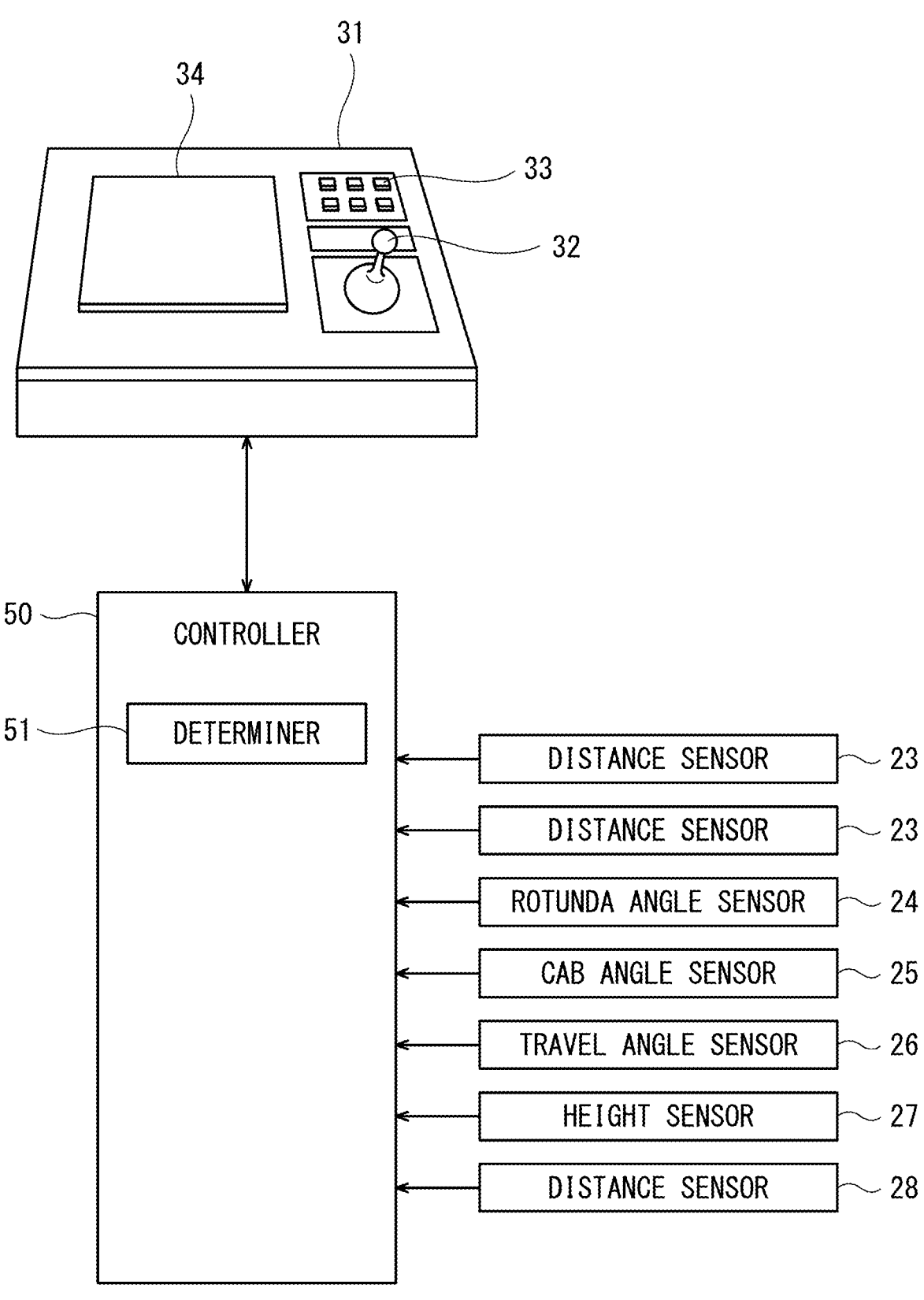
FIG. 3 shows one example of a control board, etc.

FIG. 1 is a schematic plan view showing one example of a passenger boarding bridge according to an embodiment of the present invention. FIG. 2 is a front view of the distal end part of a cab to be docked with an aircraft (the front view is taken from the aircraft side). FIG. 3 shows one example of a control board, etc.

The passenger boarding bridge 1 includes: a horizontally rotatable rotunda (proximal-end round room) 4 connected to an entrance of a terminal building 2 of an airport; a tunnel unit 5, whose proximal end is connected to the rotunda 4; and a cab (distal-end round room) 6 provided at the distal end of the tunnel unit 5, such that the cab 6 is rotatable in regular and reverse directions. It should be noted that, for example, auxiliary stairs (not shown) that an operator or the like on the ground uses to get in and out of the cab 6 are set on the side of the tunnel unit 5.

The rotunda 4 is supported by a support pillar, such that the rotunda 4 is rotatable in regular and reverse directions about a rotational axis (vertical axis) CL1. The tunnel unit 5 forms a passenger walkway, and includes a plurality of tubular tunnels 5a and 5b, which are fitted together in a telescopic manner (nested manner), such that the tunnel unit 5 is extendable and retractable in the longitudinal direction. In the illustrated example, the tunnel unit 5 is formed by the two tunnels 5a and 5b. The tunnel unit 5 is formed by two or more tunnels. The proximal end part of the tunnel unit 5 is connected to the rotunda 4 in such a manner that the tunnel unit 5 is swingable vertically.

The distal side of the tunnel unit 5 (specifically, the tunnel 5b, which is the frontmost tunnel) is provided with drive columns 7, which serve as support legs. The drive columns 7 are provided with a lifting/lowering device 8, which moves the cab 6 and the tunnel unit 5 upward and downward (i.e., lifts and lowers the cab 6 and the tunnel unit 5). By moving the tunnel unit 5 upward/downward by the lifting/lowering device 8, the cab 6 and the tunnel unit 5 can be swung vertically with respect to the rotunda 4.

The drive columns 7 are further provided with a travel device 10 including a pair of travel wheels 9 (a right travel wheel 9R and a left travel wheel 9L), which are drivable to rotate independently of each other in regular and reverse directions. The travel device 10 is provided below the lifting/lowering device 8. The travel device 10 is configured to travel forward by regular rotation of the two travel wheels 9, and to travel backward by reveres rotation of the two travel wheels 9. The travel device 10 is also configured to be rotatable in regular and reverse directions about a rotational axis CL2, such that the rudder angle is changeable within the range of −90° to +90° with respect to the extension/retraction direction (longitudinal direction) of the tunnel unit 5, and thus the travel direction of the travel device 10 is changeable. For example, by causing the two travel wheels 9 to rotate in opposite directions to each other, the travel direction (the facing direction of the travel wheels 9) can be changed on the spot. By causing the travel device 10 (the travel wheels 9) to travel on the apron, the tunnel unit 5 can be rotated about the rotunda 4 and can be extended/retracted.

The cab 6 is provided at the distal end of the tunnel unit 5. The cab 6 is configured to be rotatable, by means of an unshown rotational mechanism, in regular and reverse directions about a rotational axis CL3, which is perpendicular to the floor surface of the cab 6.

As shown in FIG. 2, a bumper 62 is provided at the distal end of a floor 61 of the cab 6 to be docked with an aircraft 3. A plurality of (in this example, two) distance sensors 23 (e.g., laser distance meters), each of which detects the distance between the cab 6 and the aircraft 3, are mounted to the bumper 62, such that the distance sensors 23 are arranged in the left-right direction of the bumper 62.

As shown in FIG. 2, a closure 63 is provided at the distal end part of the cab 6. The closure 63 includes a bellows portion that is expandable and contractible in the front-back direction. At the time of docking the cab 6 with the aircraft, by expanding the bellows portion forward, the front end of the bellows portion can be brought into contact with the aircraft around the entrance thereof.

As shown in FIG. 3, the passenger boarding bridge 1 further includes: a rotunda angle sensor 24, which detects a rotational angle of the rotunda 4; a cab angle sensor 25, which detects a rotational angle of the cab 6 with respect to the tunnel unit 5; a travel angle sensor 26, which detects a rotational angle of the travel device 10 with respect to the tunnel unit 5 (an angle indicating the travel direction of the travel device 10); a height sensor 27, which measures the amount of lifting/lowering of the tunnel unit 5 by the lifting/lowering device 8 and detects the height of the tunnel unit 5; and a distance sensor 28, which detects a distance from the center point of the rotunda 4 (i.e., the position of the rotational axis CL1) to the center point of the cab 6 (i.e., the position of the rotational axis CL3) (this distance is hereinafter referred to as "distance R"). These sensors are arranged at suitable positions, respectively. The distance sensor 28 is configured as, for example, a distance meter that measures the length of the tunnel unit 5. The distance sensor 28 is capable of calculating the distance R from its measurement value, and also capable of calculating a distance from the center point of the rotunda 4 (the position of the rotational axis CL1) to the center point of the pair of travel wheels 9 (the position of the rotational axis CL2).

A control board 31 as shown in FIG. 3 is provided inside the cab 6. The control board 31 is provided with various operation switches 33 for performing operations of, for example, lifting/lowering the tunnel unit 5 and the cab 6 by the lifting/lowering device 8 and rotating the cab 6. The control board 31 is further provided with: an operating lever 32 for operating the travel device 10; and a display device 34. The operating lever 32 is configured as a lever-shaped input device (a joystick) that has degrees of freedom multi-directionally.

A controller 50 and the control board 31 are connected to each other via electrical circuitry. The controller 50 is configured to: receive inputs of information (operation information) that is based on operations performed with the operation switches 33 and the operating lever 32; receive inputs of, for example, output signals from the sensors 23 to 28; control the operations of the passenger boarding bridge 1; and output, for example, information to be displayed on the display device 34.

It should be noted that the controller 50 includes an arithmetic processing unit such as a CPU and a storage unit including a ROM, RAM, etc. A control program for operating the passenger boarding bridge 1 and information necessary for the operations of the passenger boarding bridge 1 are prestored in the storage unit. By executing the control program, the arithmetic processing unit functions as a controller that, for example, controls the operations of the components of the passenger boarding bridge 1 (the operations of, for example, the travel device 10, the lifting/lowering device 8, and the rotational mechanism of the cab 6), and also functions as, for example, a determiner 51 described below. It should be noted that information to be stored while the passenger boarding bridge 1 is in operation is also stored in the storage unit. The controller 50 may be configured as a single control device performing centralized control, or may be configured as a plurality of control devices performing distributed control in cooperation with each other via the Internet and LAN. For example, the cab 6 or the frontmost tunnel 5b is provided with the controller 50.

Next, one example of operations of the passenger boarding bridge 1 is described. Operations of the passenger boarding bridge 1 are realized by control performed by the controller 50.

Before the aircraft 3 arrives at the apron, the passenger boarding bridge 1 stands by at a predetermined standby position indicated by two-dot chain line of FIG. 1.

A regular stop position for the aircraft 3 is a predetermined position, at which the aircraft axis of the aircraft 3 is on a fuselage guide line AL, and the regular stop position is set in the extending direction of the fuselage guide line AL. The aircraft 3 is brought to a stop targeting the regular stop position. Although there are cases where an actual stop position of the aircraft 3 deviates from the regular stop position, when the aircraft 3 stops, the aircraft axis of the aircraft 3 is substantially on the fuselage guide line AL as illustrated in FIG. 1. It should be noted that the fuselage guide line AL is drawn on the apron.

For example, the operator operates the operating lever 32 and various operation switches 33 on the control board 31 to move the passenger boarding bridge 1 standing by at the standby position indicated by two-dot chain line in FIG. 1 to, for example, a docking position indicated by solid line in FIG. 1 to dock the cab 6 with the aircraft. At the time, the operator sets, as the target position, for example, a position that is forward from a door 3a of the aircraft 3 by an arbitrary distance (e.g., about 1 m). Then, the operator causes the travel device 10 to travel forward such that the cab 6 moves from the standby position and reaches the target position, and operates the lifting/lowering device 8 and the rotational mechanism of the cab 6 such that, at the target position, the bumper 62 of the distal end part of the cab 6 faces the door 3a of the aircraft 3. Thereafter, the operator causes the travel device 10 to travel forward such that the cab 6 moves straight toward the door 3a, thereby docking the cab 6 with the aircraft 3. After docking the cab 6 with the aircraft 3, the operator operates the control board 31 to expand the closure 63. The docking method thus described is merely one example of a general docking method. Depending on, for example, the operator performing the docking, the docking of the cab 6 is not necessarily performed by the above-described method. For example, there may be a case where after causing the travel device 10 to travel forward, the operator docks the cab 6 with the aircraft 3 by backward travel of the travel device 10.

When the cab 6 is in the state of being docked with the aircraft 3, the bumper 62 of the distal end part of the cab 6 may be in contact with the aircraft 3, or a slight gap that would not hinder walking between the cab 6 and the aircraft 3 may be formed between the bumper 62 and the aircraft 3.

It should be noted that part of, or the entirety of, operations of the passenger boarding bridge 1 until it is docked with the aircraft 3 may be automatically performed through the control performed by the controller 50.

Next, a description is given of a case where the passenger boarding bridge 1 is undocked from the aircraft 3 and returned to the standby position.

The controller 50 uses XY orthogonal coordinates as shown in FIG. 1 to recognize the position (coordinates) of each part of the passenger boarding bridge 1. In this example, the center point of the rotunda 4 (the position of the rotational axis CL1) is set as an origin (0, 0), and based thereon, an X-axis and a Y-axis are set as shown in FIG. 1. However, the X- and Y-axes can be set arbitrarily.

In the present embodiment, at the time of undocking the passenger boarding bridge 1 from the aircraft 3, before the undocking, the controller 50 performs an undocking determination process (a function of the determiner 51) to determine whether or not the travel direction of backward travel of the travel device 10 (the travel wheels 9) is a direction within a smooth undocking range. Hereinafter, the undocking determination process performed by the determiner 51 is described.

The passenger boarding bridge 1 indicated by solid line in FIG. 1 is assumed to be in the state of being docked with the aircraft 3 by a basic docking operation (i.e., basic docked state). In the case of the basic docked state, the passenger boarding bridge 1 is docked with the aircraft 3 by forward travel of the travel wheels 9, such that the travel direction of the travel wheels 9 (9L, 9R) is perpendicular to the fuselage guide line AL. Accordingly, an axis WL of the travel wheels 9 (the center line of the axle of the travel wheels 9) is parallel to the fuselage guide line AL. In FIG. 1, for the sake of convenience, a parallel line Yp parallel to the Y-axis and a parallel line Xp parallel to the X-axis are drawn. It should be noted that the facing direction of the travel wheels 9 before undocking is the same as the facing direction of the travel wheels 9 at the end of previously performed docking.

As one specific example of the aforementioned undocking determination process, before undocking, the determiner 51 determines whether or not the travel direction of the backward travel of the travel device 10 is a direction within the smooth undocking range by determining whether or not the angle of the axis WL of the travel wheels 9 as seen in a plan view (as seen from immediately above) is less than an axle determination angle Wt. The angle of the axis WL is an angle that is formed by a center line Ed of the tunnel unit 5 and the axis WL of the travel wheels 9 and that is calculated clockwise with respect to the center line Ed of the tunnel unit 5 (hereinafter, the angle of the axis WL is referred to as "axle angle Wr").

The current axle angle Wr before undocking can be calculated based on an angle currently detected by the travel angle sensor 26. For example, an angle detected by the travel angle sensor 26 when the forward travel direction of the travel wheels 9 is the extending direction of the tunnel unit 5 is set to 0°; an angle detected by the travel angle sensor 26 when the forward travel direction of the travel wheels 9 is shifted to the left with respect to the extending direction of the tunnel unit 5 is detected as a negative angle value; an angle detected by the travel angle sensor 26 when the forward travel direction of the travel wheels 9 is shifted to the right with respect to the extending direction of the tunnel unit 5 is detected as a positive angle value; and the axle angle Wr is calculated by adding 90 degrees to the angle detected by the travel angle sensor 26.

The axle determination angle Wt is, when the passenger boarding bridge 1 is in the basic docked state of being docked with the aircraft 3 by a basic docking operation, calculated clockwise with respect to the center line Ed of the tunnel unit 5 in a plan view. The axle determination angle Wt is an angle obtained by adding 90 degrees to an angle Wx formed by the axis WL of the travel wheels 9. Specifically, when the passenger boarding bridge 1 is in the basic docked state, the axis WL of the travel wheels 9 is parallel to the fuselage guide line AL. Accordingly, in a plan view, the axle determination angle Wt is an angle that is obtained by adding 90 degrees to the angle Wx formed by the fuselage guide line AL, the angle Wx being calculated clockwise with respect to the center line Ed of the tunnel unit 5 before undocking the cab 6 from the aircraft 3. The axle determination angle Wt can be calculated by an equation below.

$$Wt=Wx+90=(90-\alpha+\gamma)+90=180-\alpha+\gamma$$

In the above equation, $\alpha$ is an angle that is formed by the center line Ed of the tunnel unit 5 with respect to the X-axis and that is determined from a value detected by the rotunda angle sensor 24. Also, $\gamma$ is an angle that is formed by the fuselage guide line AL or its extension line with respect to the Y-axis and that is prestored as a predetermined value in the storage unit of the controller 50. The angle $\gamma$ illustrated in the drawing is a positive value. However, in a case where the fuselage guide line crosses the Y-axis (or the parallel line Yp parallel to the Y-axis) in a manner reverse to the illustrated fuselage guide line AL, the angle $\gamma$ is a negative value, and in a case where the fuselage guide line is parallel to the Y-axis, the angle $\gamma$ is 0.

The determiner 51 calculates the axle determination angle Wt before undocking, and if the current axle angle Wr before undocking is less than the axle determination angle Wt, determines that the travel direction of the backward travel of the travel device 10 is a direction within the smooth undocking range, whereas if the current axle angle Wr is greater than or equal to the axle determination angle Wt, determines that the travel direction of the backward travel of the travel device 10 is a direction outside the smooth undocking range.

Figure 4:
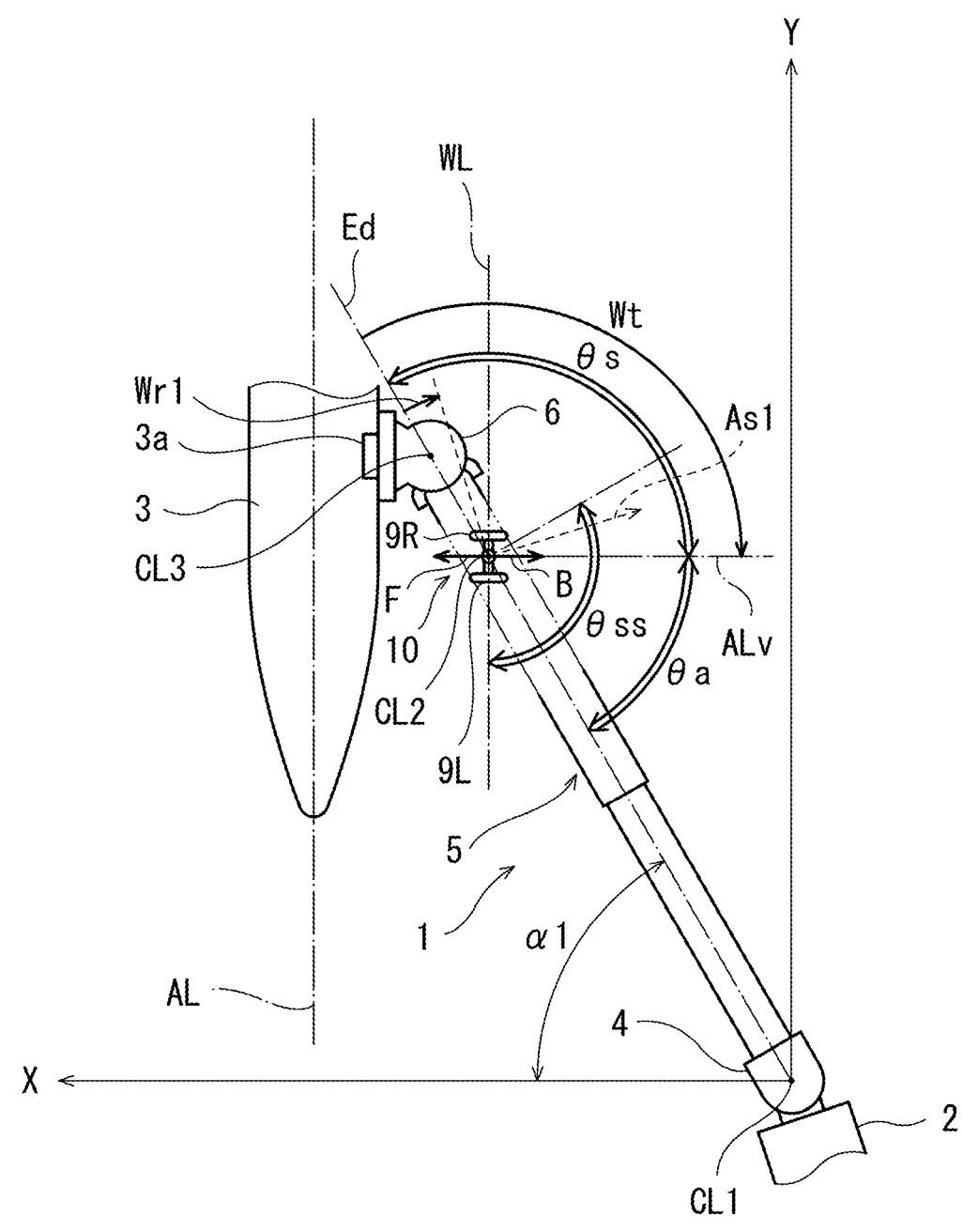
FIG. 4 shows a state that is a result of, in FIG. 1, rotating an X-axis and a Y-axis clockwise by a predetermined angle, such that the Y-axis is parallel to a fuselage guide line.

This process is further described with reference to FIG. 4. FIG. 4 shows a state that is a result of, in FIG. 1, rotating the X-axis and the Y-axis clockwise by the angle $\gamma$, such that the Y-axis is parallel to the fuselage guide line AL. Therefore, the case illustrated in FIG. 4 corresponds to a case where, in FIG. 1, $\gamma=0$ and $\alpha-\gamma=\alpha1$. It should be noted that the determination performed by the determiner 51 is only angle determination. For this reason, even when the coordinate axes are rotated as shown in FIG. 4 for the sake of convenience, the description can still be given properly. It should be noted that FIG. 4 shows a perpendicular line ALv, which passes through the center point of the pair of travel wheels 9 (9L, 9R) and which is perpendicular to the fuselage guide line AL. In the illustrated travel device 10, an arrow F indicates a forward travel direction, and an arrow B indicates a backward travel direction.

In FIG. 4, an angle range in which the axle angle Wr is less than the axle determination angle Wt is indicated as a smooth undocking angle range $\theta$s, within which smooth undocking can be performed. In a case where the current axle angle Wr is an angle within the smooth undocking angle range $\theta$ (e.g., Wr1), if the travel wheels 9 are caused to travel straight backward without changing their facing direction, the travel wheels 9 travel in a direction within a smooth undocking range $\theta$ss (e.g., the direction of an arrow As1), and the cab 6 moves away from the aircraft 3. Thus, the cab 6 can be smoothly undocked from the aircraft 3 by causing the travel wheels 9 to travel backward by a predetermined distance (e.g., 0.5 to 1.0 m). It should be noted that, as previously mentioned, the rudder angle of the travel device 10 is changeable within the range of −90° to +90° with respect to the extension/retraction direction (the center line Ed) of the tunnel unit 5. Accordingly, the smooth undocking angle range $\theta$s calculated clockwise with respect to the center line Ed of the tunnel unit 5 is a range that is not less than 0° but less than the axle determination angle Wt.

On the other hand, in a case where the current axle angle Wr is an angle within an angle range $\theta$a shown in FIG. 4, if the travel wheels 9 are caused to travel straight backward without changing their facing direction, the cab 6 is moved in a direction to be pressed against the aircraft 3, resulting in a collision accident between the cab 6 and the aircraft 3. In this case, the cab 6 is in the state of being docked with the aircraft 3 by backward travel. For this reason, in order to undock the cab 6 from the aircraft 3, unlike normal undocking, it is necessary to cause the travel wheels 9 to travel forward.

Figure 5:
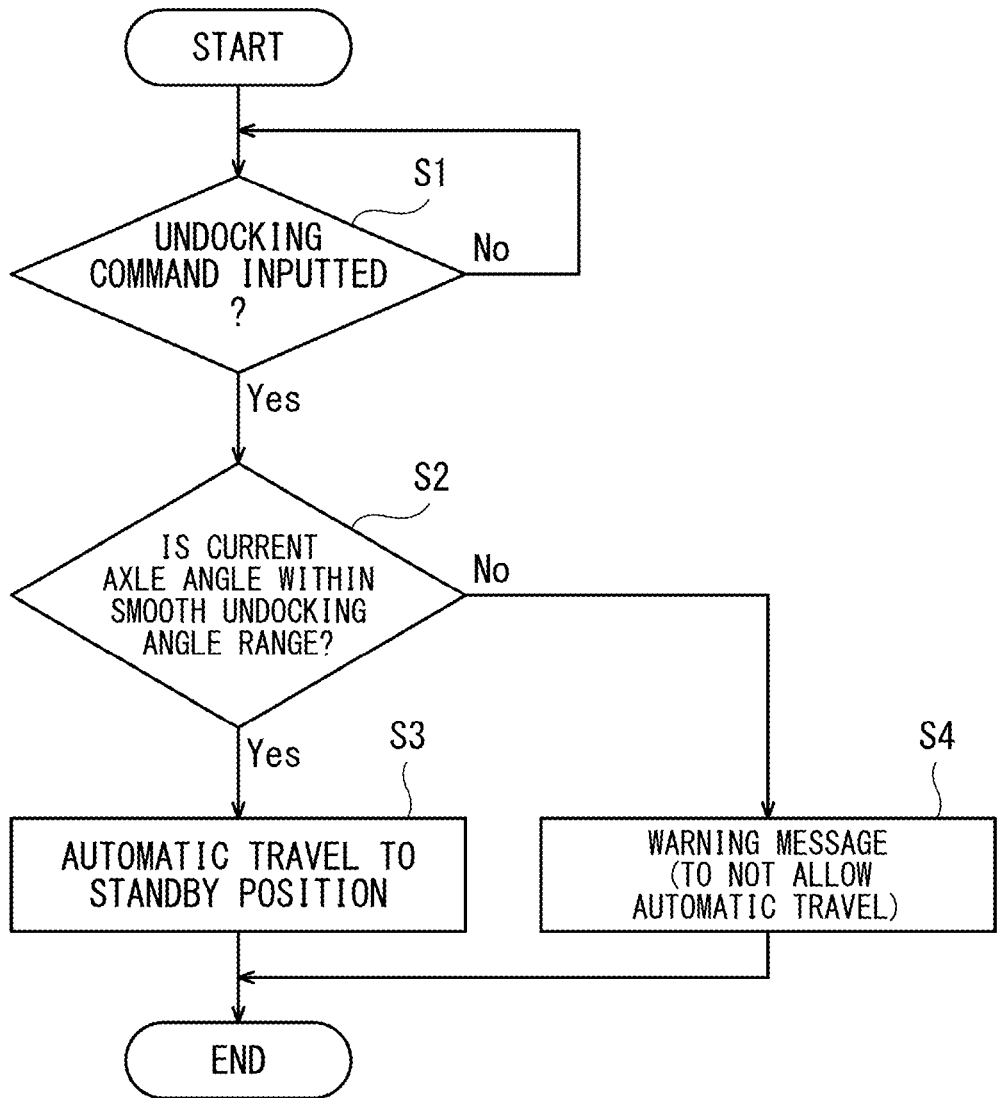
FIG. 5 is a flowchart showing one example of operations performed when undocking the passenger boarding bridge from the aircraft and returning the passenger boarding bridge to a standby position.

FIG. 5 is a flowchart showing one example of operations performed when undocking the passenger boarding bridge 1 from the aircraft 3 and returning the passenger boarding bridge 1 to the standby position. These operations are realized by control performed by the controller 50. It should be noted that the position coordinates of the travel device 10 (the position coordinates of the center point of the pair of travel wheels 9) at the standby position, which are indicated by XY coordinates in FIG. 1, are prestored in the controller 50. Further, based on a value measured by the distance sensor 28, which measures the length of the tunnel unit 5, the controller 50 calculates the distance from the center point of the rotunda 4 to the center point of the pair of travel wheels 9. Based on the calculated distance and a value detected by the rotunda angle sensor 24 (e.g., an angle $\alpha$ in the case of FIG. 1), the controller 50 calculates, whenever necessary, the position coordinates of the travel device 10 at the current position.

The operator operates the control board 31 to contract the closure 63 and then, for example, pushes a return button of the control board 31 (one of the operation switches 33), the return button being configured as a dead man's switch, thereby starting automatic control for returning the passenger boarding bridge 1 to the standby position. The operating button for starting such automatic control need not be a dead man's switch, but may be an operating button that is operated by one-push operation. The automatic control may be started from, for example, an external device or a mobile terminal.

When the aforementioned return button is pushed, an undocking command from the control board 31 is inputted to the controller 50. When the undocking command is inputted (Yes in step S1), the controller 50 calculates the above-described current axle angle Wr and axle determination angle Wt, and determines whether or not the current axle angle Wr is an angle within the smooth undocking angle range $\theta$s (i.e., an angle less than the axle determination angle Wt) (step S2: undocking determination process).

If the current axle angle Wr determines to be an angle within the smooth undocking angle range $\theta$s in the undocking determination process in step S2, the controller 50 performs automatic travel to the standby position (step S3). Specifically, the controller 50 causes the travel wheels 9 to travel straight backward by a predetermined distance (e.g., 0.5 to 1.0 m) without changing their facing direction, then rotates the travel wheels 9 on the spot such that the direction of the backward travel of the travel wheels 9 coincides with the direction to the standby position, and thereafter causes the travel wheels 9 to travel backward to the standby position (automatic control). The controller 50 also controls the rotational mechanism of the cab 6 and the lifting/lowering device 8 such that, at the standby position, the facing direction of the cab 6 and the height of the tunnel unit 5 coincide with a predetermined facing direction and a predetermined height, respectively.

On the other hand, if the current axle angle Wr is determined not to be an angle within the smooth undocking angle range θs in the undocking determination process in step S2, the controller 50 causes the display device 34 of the control board 31 to display a warning message to prohibit (not allow) automatic travel (step S4). The warning message may be, for example, a message that requests for manual operation to be done carefully, such as "Abnormally docked state. Undock by manual operation with enough attention to safety." In this case, the operator, while paying enough attention to safety, operates the travel device 10 and so forth by manual operation to undock the passenger boarding bridge 1 from the aircraft 3 and to return the passenger boarding bridge 1 to the standby position (manual control).

In the above-described example, the undocking determination process is performed before undocking the passenger boarding bridge 1 (the cab 6) from the aircraft 3, and the undocking method is switched (between automatic control and manual control) in accordance with the result of the determination in the undocking determination process. This makes it possible to eliminate a hindrance to the undocking from the aircraft.

It should be noted that the above-described example is a case where the operator, at first, wishes to return the passenger boarding bridge 1 to the standby position by automatic control. Hereinafter, a description is given of a case where the operator, from the beginning, intends to return the passenger boarding bridge 1 to the standby position by manual operation. In this case, after contracting the closure 63, the operator pushes a safety confirmation button (one of the operation switches 33) of the control board 31. When the safety confirmation button is pushed, a safety confirmation command from the control board 31 is inputted to the controller 50. When the safety confirmation command is inputted, the controller 50 performs an undocking determination process that is the same as the undocking determination process performed in step S2 of FIG. 5. If the result of the determination in the undocking determination process is Yes, the controller 50, for example, causes the display device 34 of the control board 31 to display the following message: "Normally docked state. Undock by normal operation." Looking at the message, the operator undocks the passenger boarding bridge 1 from the aircraft 3 and returns the passenger boarding bridge 1 to the standby position by operating the travel device 10 and so forth by normal operation. Specifically, the operator causes the travel device 10 to travel backward by a predetermined distance without changing the facing direction of the travel wheels 9, thereby undocking the passenger boarding bridge 1 from the aircraft 3, and then causes the travel device 10 to travel backward to the standby position (normal operation by manual control).

On the other hand, if the result of the above determination is No, the controller 50 causes the display device 34 of the control board 31 to display the same warning message as that displayed in step S4 of FIG. 5. Looking at the message, the operator, while paying enough attention to safety, operates the travel device 10 and so forth by manual operation to undock the passenger boarding bridge 1 from the aircraft 3 and to return the passenger boarding bridge 1 to the standby position (irregular operation by manual control).

Also in this case, the undocking determination process is performed before undocking the passenger boarding bridge 1 (the cab 6) from the aircraft 3, and the undocking method is switched (between normal operation by manual control and irregular operation by manual control) in accordance with the result of the determination in the undocking determination process. This makes it possible to eliminate a hindrance to the undocking from the aircraft.

It should be noted that the aforementioned undocking command that is inputted through an operation of the return button for starting the automatic control can be considered to include the safety confirmation command.

Also, messages displayed by the display device 34, such as the warning message, may alternatively be outputted as audio messages from a speaker of, for example, the control board 31.

In the above-described example (hereinafter, "first configuration example"), in a plan view, the axle determination angle Wt is calculated by adding 90 degrees to the angle Wx formed by the fuselage guide line AL drawn on the apron, the angle Wx being calculated clockwise with respect to the center line Ed of the tunnel unit 5 (Wt=Wx+90). Alternatively, second to fourth configuration examples described below may be adopted.

Second Configuration Example

Since the cab 6 is undocked from the aircraft 3, in a plan view, the axle determination angle Wt may be calculated by adding 90 degrees to an angle Wx1 (FIG. 1) formed by a tangent line TL1 (see FIG. 1). The tangent line TL1 extends horizontally and touches a surface, of the aircraft 3, with which the cab 6 is docked. The angle Wx1 is calculated clockwise with respect to the center line Ed of the tunnel unit 5.

The angle Wx1 in this case may be calculated in the following manner. For example, an angle that the tangent line TL1 forms with a straight line (TL2) is calculated. The tangent line TL1 touches a part, of the aircraft 3, with which the cab 6 is docked (hereinafter, this part is referred to as "the cab 6-docked part" of the aircraft 3). The straight line (TL2) extends along a distal end edge 6a of the cab 6. The angle that the tangent line TL1 forms with the straight line (TL2) is calculated based on the following distances: distances detected by the two respective distance sensors 23 (see FIG. 2 and FIG. 3), each of which detects a distance between the cab 6 and the aircraft 3; and a distance (a predetermined value) between the two distance sensors 23. Then, based on the calculated angle and the rotational angle of the cab 6 with respect to the center line Ed of the tunnel unit 5, the rotational angle being detected by the cab angle sensor 25 (see FIG. 3), the angle Wx1 can be calculated. It should be noted that the rotational angle of the cab 6 is detected as an angle formed by the center line Ed of the tunnel unit 5 and a straight line that is orthogonal to the straight line (TL2) extending along the distal end edge 6a of the cab 6.

For example, in FIG. 1, assume a case in which: the rotational angle of the cab 6 with respect to the center line Ed of the tunnel unit 5 is (3; the tangent line TL1, which touches the cab 6-docked part of the aircraft 3, rises more than the straight line TL2, which extends along the distal end edge 6a of the cab 6; and the angle that the tangent line TL1 forms with the straight line TL2 is Tx (Tx<90°). In this case, the angle Wx1 can be calculated by an equation shown below.

$$Wx1 = 90 - \beta - Tx$$

On the other hand, in FIG. 1, assume a case in which: the straight line TL2, which extends along the distal end edge 6a of the cab 6, rises more than the tangent line TL1, which touches the cab 6-docked part of the aircraft 3; and the angle that the tangent line TL1 forms with the straight line TL2 is Tx (Tx<90°). In this case, the angle Wx1 can be calculated by an equation shown below.

$$Wx1=90\beta+Tx$$

Third Configuration Example

The extending direction of the tangent line TL1, which touches the cab 6-docked part of the aircraft 3, is substantially the same as the extending direction of the straight line TL2, which extends along the distal end edge 6a of the cab 6 (FIG. 1 illustrates a case where TL1 is equal to TL2). In light of this, in a plan view, the axle determination angle Wt may be calculated by adding 90 degrees to an angle Wx2 (see FIG. 1). The angle Wx2 is formed by the straight line TL2, which extends along the distal end edge 6a of the cab 6 and which is calculated clockwise with respect to the center line Ed of the tunnel unit 5.

In this case, the angle Wx2 can be calculated, for example, based on the rotational angle of the cab 6 with respect to the center line Ed of the tunnel unit 5, the rotational angle being detected by the cab angle sensor 25.

For example, in FIG. 1, in a case where the rotational angle of the cab 6 with respect to the center line Ed of the tunnel unit 5 is β, the angle Wx2 can be calculated by an equation shown below.

$$Wx2=90-\beta$$

Fourth Configuration Example

In the above-described first configuration example, the axle determination angle Wt is calculated based on the angle Wx, which is formed by the center line Ed of the tunnel unit 5 and the fuselage guide line AL drawn on the apron. The aircraft 3 does not necessarily come to a stop in such a manner that the aircraft axis is positioned immediately above the fuselage guide line AL. Therefore, the axle determination angle Wt may be calculated based on an angle that is formed between the center line Ed of the tunnel unit 5 and an aircraft axis line (a straight line extending along the aircraft axis) of the aircraft 3. Specifically, in a plan view, the axle determination angle Wt may be calculated by adding 90 degrees to an angle (hereinafter, "angle Wx3") that is formed by the aircraft axis line of the aircraft 3 and that is calculated clockwise with respect to the center line Ed of the tunnel unit 5.

In this case, for example, the controller 50 stores, for each aircraft type, an angle (hereinafter, "angle M") that is formed between the aircraft axis line of the aircraft 3 and the tangent line TL1 touching the cab 6-docked part of the aircraft 3. Then, the angle Wx3 can be calculated based on this angle M and the angle Wx1 calculated in the above-described manner. Here, the above-described angle Wx2 may be used instead of the angle Wx1, because the angle Wx1 is substantially the same as the angle Wx2.

It should be noted that, in the fourth configuration example, the controller 50 may receive an actual stop position of and aircraft type information about the aircraft 3 from an external device that has a function of measuring the actual stop position of the aircraft 3, and may calculate the angle Wx3 formed by the aircraft axis line of the aircraft 3 by also using these received information. The external device may be, for example, VDGS (Visual Docking Guidance System).

In the above-described second configuration example, the controller 50 may receive an actual stop position of and aircraft type information about the aircraft 3 from an external device (e.g., VGDS) that has a function of measuring the actual stop position of the aircraft 3, and may calculate the angle Wx1 formed by the tangent line TL1, which touches the cab 6-docked part of the aircraft 3, by also using these received information.

In the case of adopting the first configuration example, the axle determination angle Wt can be calculated in a simple manner. Since the aircraft 3 does not necessarily come to a stop in such a manner that the aircraft axis is positioned immediately above the fuselage guide line AL, by adopting the fourth configuration example, a more useful axle determination angle Wt can be calculated as compared to the first configuration example. Further, in the case of adopting the second or third configuration example, a more useful axle determination angle Wt can be calculated as compared to the first and fourth configuration examples. The second and third configuration examples are advantageous particularly in a case where the tangent line TL1, which touches the cab 6-docked part of the aircraft 3, is not parallel to the aircraft axis line of the aircraft 3.

In the above first to fourth configuration examples, before undocking, the determiner 51 determines whether or not the travel direction of the backward travel of the travel wheels 9 (9L, 9R) is a direction within the smooth undocking range θss based on whether or not the current axle angle Wr is less than the axle determination angle Wt. Alternatively, the determiner 51 may directly obtain the travel direction of the backward travel of the travel wheels 9 (9L, 9R) and the smooth undocking range θss, and then determine whether or not the travel direction of the backward travel of the travel wheels 9 is a direction within the smooth undocking range θss. In this case, the travel direction of the backward travel of the travel wheels 9 (e.g., the direction of arrow B in FIG. 4) can be calculated based on the angle detected by the travel angle sensor 26 and the angle α determined from the value detected by the rotunda angle sensor 24. The smooth undocking range θss is a result of rotating the smooth undocking angle range θs clockwise by 90 degrees (see FIG. 4, for example), and is a range that is not less than 90° but less than Wt+90° as calculated clockwise with respect to the center line Ed of the tunnel unit 5. Here, Wt is equal to the above-described axle determination angle Wt.

Thus, the smooth undocking range θss in the first configuration example is an angle range that is, in a plan view, not less than 90 degrees as calculated clockwise with respect to the center line Ed of the tunnel unit 5 before undocking the cab 6 from the aircraft 3, and is, in the plan view, less than an angle that is obtained by adding 180 degrees to the angle Wx. The angle Wx is formed by the fuselage guide line AL on the apron and calculated clockwise with respect to the center line Ed of the tunnel unit 5 before undocking the cab 6 from the aircraft 3.

The smooth undocking range θss in the second configuration example is an angle range that is, in a plan view, not less than 90 degrees as calculated clockwise with respect to the center line Ed of the tunnel unit 5 before undocking the cab 6 from the aircraft 3, and is, in the plan view, less than an angle that is obtained by adding 180 degrees to the angle Wx1. The angle Wx1 is formed by the tangent line TL1, which extends horizontally and touches the cab 6-docked part of the aircraft 3. The angle Wx1 is calculated clockwise with respect to the center line Ed of the tunnel unit 5 before undocking the cab 6 from the aircraft 3.

The smooth undocking range θss in the third configuration example is an angle range that is, in a plan view, not less than 90 degrees as calculated clockwise with respect to the center line Ed of the tunnel unit 5 before undocking the cab 6 from the aircraft 3, and is, in the plan view, less than an angle that is obtained by adding 180 degrees to the angle Wx2. The angle Wx2 is formed by the straight line TL2, which extends along the distal end edge 6*a* of the cab 6. The angle Wx2 is calculated clockwise with respect to the center line Ed of the tunnel unit 5 before undocking the cab 6 from the aircraft 3.

The smooth undocking range θss in the fourth configuration example is an angle range that is, in a plan view, not less than 90 degrees as calculated clockwise with respect to the center line Ed of the tunnel unit 5 before undocking the cab 6 from the aircraft 3, and is, in the plan view, less than an angle that is obtained by adding 180 degrees to the angle Wx3. The angle Wx3 is formed by the aircraft axis line of the aircraft 3, and is calculated clockwise with respect to the center line Ed of the tunnel unit 5 before undocking the cab 6 from the aircraft 3.

In the first to fourth configuration examples, the smooth undocking angle range θs is a range that is calculated clockwise with respect to the center line Ed of the tunnel unit 5 and that is not less than 0° but less than the axle determination angle Wt (hereinafter, this range is referred to as "range A").

However, depending on the aircraft type of the aircraft 3, for example, there is a case where a pitot tube is provided in a manner to protrude near the door 3*a*, and depending on a positional relationship between the stopped aircraft 3 and the passenger boarding bridge 1 (the rotunda 4), it is necessary to consider avoiding the pitot tube of the aircraft 3 when undocking the cab 6 from the aircraft 3. Also, depending on the aircraft type of the aircraft 3, there is a case where the distance between the engine of the aircraft 3 and the door 3*a* is close, and depending on a positional relationship between the stopped aircraft 3 and the passenger boarding bridge 1 (the rotunda 4), it is necessary to consider avoiding the engine of the aircraft 3 when undocking the cab 6 from the aircraft 3. It should be noted that the positional relationship between the stopped aircraft 3 and the passenger boarding bridge 1 (the rotunda 4) is not limited to the one shown in FIG. 1.

In a case where it is necessary to consider avoiding, for example, the pitot tube or the engine of the aircraft 3 as mentioned above, an angle range narrower than the aforementioned range A is set as the smooth undocking angle range θs used in the undocking determination process. For example, in the passenger boarding bridge 1, a range that is excluded from the range A (hereinafter, "excluded range B") is preset for each aircraft type. In this case, the controller 50 prestores excluded ranges B that are set corresponding to respective aircraft types. For the aircraft 3, the controller 50 calculates the smooth undocking angle range θs by excluding, from the range A, the excluded range B corresponding to the aircraft type of the aircraft 3. Each excluded range B can be set, for example, as a range less than P degrees, or a range not less than Q degrees. In a case where the excluded range B is the range less than P degrees, the smooth undocking angle range θs is a range that is calculated clockwise with respect to the center line Ed of the tunnel unit 5 and that is not less than P degrees but less than the axle determination angle Wt (0<P<Wt). In a case where the excluded range B is the range not less than Q degrees, the smooth undocking angle range θs is a range that is calculated clockwise with respect to the center line Ed of the tunnel unit 5 and that is not less than 0° but less than Q degrees (0<Q<Wt). Needless to say, in the case of an aircraft type for which no excluded range B is set, the range A is the smooth undocking angle range θs.

As described above, the controller 50 calculates the smooth undocking angle range θs based on information about an angle range that is excluded from the range A and that is preset in accordance with the aircraft type of the aircraft 3 (i.e., based on information about the excluded range B and information indicating that there is no excluded range B).

In the undocking determination process, in the case of using the smooth undocking range θss instead of the smooth undocking angle range θs, the smooth undocking range θss in each of the first to fourth configuration examples is an angle range (hereinafter, "range As") that is, in a plan view, not less than 90 degrees as calculated clockwise with respect to the center line Ed of the tunnel unit 5 before undocking the cab 6 from the aircraft 3, and is less than an angle that is obtained by adding 180 degrees to the above-described angle Wx, Wx1, Wx2, or Wx3 (hereinafter, "Wx0" refers to the angle Wx, Wx1, Wx2, or Wx3).

In this case, if it is necessary to consider avoiding, for example, the pitot tube or the engine of the aircraft 3 as mentioned above, then, for example, in the passenger boarding bridge 1, a range that is excluded from the range As (hereinafter, "excluded range Bs") is preset for each aircraft type. In this case, the controller 50 prestores excluded ranges Bs that are set corresponding to respective aircraft types. For the aircraft 3, the controller 50 calculates the smooth undocking range θss by excluding, from the range As, the excluded range Bs corresponding to the aircraft type of the aircraft 3. Each excluded range Bs can be set, for example, as a range less than Ps degrees, or a range not less than Qs degrees. In a case where the excluded range Bs is the range less than Ps degrees, the smooth undocking range θss is a range that is calculated clockwise with respect to the center line Ed of the tunnel unit 5 and that is not less than Ps degrees but less than an angle obtained by adding 180 degrees to the angle Wx0 (90<Ps<the angle obtained by adding 180 degrees to the angle Wx0). In a case where the excluded range Bs is the range not less than Qs degrees, the smooth undocking range θss is a range that is calculated clockwise with respect to the center line Ed of the tunnel unit 5 and that is not less than 90 degrees but less than Qs degrees (90<Qs<the angle obtained by adding 180 degrees to the angle Wx0). Needless to say, in the case of an aircraft type for which no excluded range Bs is set, the range As is the smooth undocking angle range θss.

As described above, the controller 50 calculates the smooth undocking range θss based on information about an angle range that is excluded from the range As and that is preset in accordance with the aircraft type of the aircraft 3 (i.e., based on information about the excluded range Bs and information indicating that there is no excluded range Bs).

It should be noted that in the case of obtaining aircraft type information about the aircraft 3, the controller 50 may obtain the aircraft type information from an external device such as the aforementioned VDGS, or may obtain the aircraft type information about the aircraft 3 as a result of the operator pushing an aircraft type selection button provided on the control board 31.

From the foregoing description, numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the scope of the present invention.

INDUSTRIAL APPLICABILITY

The present invention is useful, for example, as a passenger boarding bridge that makes it possible to eliminate a hindrance to undocking of the passenger boarding bridge from an aircraft.

REFERENCE CHARACTERS LIST

1 passenger boarding bridge
2 terminal building
3 aircraft
4 rotunda
5 tunnel unit
6 cab
8 lifting/lowering device
9L, 9R travel wheels
10 travel device
50 controller
51 determiner
AL fuselage guide line

The invention claimed is:

1. A passenger boarding bridge comprising:

a rotunda connected to a terminal;

a tunnel unit whose proximal end is connected to the rotunda, the tunnel unit being extendable and retractable, the tunnel unit being rotatable about the rotunda;

a travel device that supports the tunnel unit and includes a pair of travel wheels configured to travel forward and backward, the travel device being configured such that a travel direction of forward travel of the travel wheels and a travel direction of backward travel of the travel wheels are changeable;

a cab provided at a distal end of the tunnel unit, the cab being configured to be docked with an aircraft; and a determiner configured to, at a time before undocking the cab docked with the aircraft from the aircraft, perform a determination whether or not the travel direction of the backward travel of the travel wheels at the time is a direction within a smooth undocking range, wherein the direction within a smooth undocking range is a direction that avoids contact with the aircraft when undocking the cab from the aircraft, and the travel device is configured to be rotatable in regular and reverse directions about a rotational axis that is positioned at a center point of the travel wheels, such that a rudder angle of the travel device is changeable within a range of −90° to +90° with respect to a center line of the tunnel unit.

2. The passenger boarding bridge according to claim 1, wherein in a case where, in a plan view, an angle formed by an axis of the travel wheels, the angle being calculated clockwise with respect to the center line of the tunnel unit before undocking the cab from the aircraft, is an angle Wr, and in the plan view, an angle obtained by adding 90 degrees to an angle that is formed by a tangent line and that is calculated clockwise with respect to the center line of the tunnel unit before undocking the cab from the aircraft is an angle Wt, the tangent line extending horizontally and touching a cab-docked part of the aircraft, the determiner is configured to perform the determination whether or not the travel direction of the backward travel of the travel wheels is a direction within the smooth undocking range based on whether or not the angle Wr is within an angle range that is set based on predetermined information within a range less than the angle Wt.

3. The passenger boarding bridge according to claim 1, wherein in a case where, in a plan view, an angle formed by an axis of the travel wheels, the angle being calculated clockwise with respect to the center line of the tunnel unit before undocking the cab from the aircraft, is an angle Wr, and in the plan view, an angle obtained by adding 90 degrees to an angle that is formed by a straight line and that is calculated clockwise with respect to the center line of the tunnel unit before undocking the cab from the aircraft is an angle Wt, the straight line extending along a distal end edge of the cab, the determiner is configured to perform the determination whether or not the travel direction of the backward travel of the travel wheels is a direction within the smooth undocking range based on whether or not the angle Wr is within an angle range that is set based on predetermined information within a range less than the angle Wt.

4. The passenger boarding bridge according to claim 1, wherein in a case where, in a plan view, an angle formed by an axis of the travel wheels, the angle being calculated clockwise with respect to the center line of the tunnel unit before undocking the cab from the aircraft, is an angle Wr, and in the plan view, an angle obtained by adding 90 degrees to an angle that is formed by a fuselage guide line on an apron and that is calculated clockwise with respect to the center line of the tunnel unit before undocking the cab from the aircraft is an angle Wt, the determiner is configured to perform the determination whether or not the travel direction of the backward travel of the travel wheels is a direction within the smooth undocking range based on whether or not the angle Wr is within an angle range that is set based on predetermined information within a range less than the angle Wt.

5. The passenger boarding bridge according to claim 1, wherein in a case where, in a plan view, an angle formed by an axis of the travel wheels, the angle being calculated clockwise with respect to the center line of the tunnel unit before undocking the cab from the aircraft, is an angle Wr, and in the plan view, an angle obtained by adding 90 degrees to an angle that is formed by an aircraft axis line of the aircraft and that is calculated clockwise with respect to the center line of the tunnel unit before undocking the cab from the aircraft is an angle Wt, the determiner is configured to perform the determination whether or not the travel direction of the backward travel of the travel wheels is a direction within the smooth undocking range based on whether or not the angle Wr is within an angle range that is set based on predetermined information within a range less than the angle Wt.

6. The passenger boarding bridge according to claim 1, wherein in a case where, in a plan view, an angle formed by an axis of the travel wheels, the angle being calculated clockwise with respect to the center line of the tunnel unit before undocking the cab from the aircraft, is an angle Wr, and in the plan view, an angle obtained by adding 90 degrees to an angle that is formed by an aircraft axis line of the aircraft and that is calculated clockwise with respect to the center line of the tunnel unit before undocking the cab from the aircraft is an angle Wt, the determiner is configured to perform the determination whether or not the travel direction of the backward travel of the travel wheels is a direction within the smooth undocking range based on whether or not the angle Wr is within an angle range that is set based on predetermined information within a range less than the angle Wt; and the predetermined information is information about an angle range that is excluded from the range less than the angle Wt and that is preset in accordance with an aircraft type of the aircraft.

7. The passenger boarding bridge according to claim 1, wherein the smooth undocking range is an angle range that is, in a plan view, not less than 90 degrees as calculated clockwise with respect to the center line of the tunnel unit before undocking the cab from the aircraft, and is, in the plan view, set based on predetermined information within a range less than an angle that is obtained by adding 180 degrees to one of the following angles:

an angle that is formed by a tangent line and that is calculated clockwise with respect to the center line of the tunnel unit before undocking the cab from the aircraft, the tangent line extending horizontally and touching a cab-docked part of the aircraft;

an angle that is formed by a straight line and that is calculated clockwise with respect to the center line of the tunnel unit before undocking the cab from the aircraft, the straight line extending along a distal end edge of the cab;

an angle that is formed by a fuselage guide line on an apron and that is calculated clockwise with respect to the center line of the tunnel unit before undocking the cab from the aircraft; and an angle that is formed by an aircraft axis line of the aircraft and that is calculated clockwise with respect to the center line of the tunnel unit before undocking the cab from the aircraft.

8. The passenger boarding bridge according to claim 1, wherein the determiner is configured to perform the determination when an undocking command is inputted, the travel device is configured to:

in a case where a result of the determination performed by the determiner indicates that the travel direction of the backward travel of the travel wheels is a direction within the smooth undocking range, perform automatic travel in which the travel device travels backward by a predetermined distance without changing a facing direction of the travel wheels and then travels backward to a predetermined standby position; and in a case where the result of the determination performed by the determiner indicates that the travel direction of the backward travel of the travel wheels is not a direction within the smooth undocking range, not perform the automatic travel, and the passenger boarding bridge further comprises a warning unit configured to perform warning in the case where the result of the determination performed by the determiner indicates that the travel direction of the backward travel of the travel wheels is not a direction within the smooth undocking range.

9. The passenger boarding bridge according to claim 1, wherein in a case where, in a plan view, an angle formed by an axis of the travel wheels, the angle being calculated clockwise with respect to the center line of the tunnel unit before undocking the cab from the aircraft, is an angle Wr, and in the plan view, an angle obtained by adding 90 degrees to an angle that is formed by a tangent line and that is calculated clockwise with respect to the center line of the tunnel unit before undocking the cab from the aircraft is an angle Wt, the tangent line extending horizontally and touching a cab-docked part of the aircraft, the determiner is configured to perform the determination whether or not the travel direction of the backward travel of the travel wheels is a direction within the smooth undocking range based on whether or not the angle Wr is within an angle range that is set based on predetermined information within a range less than the angle Wt; and the predetermined information is information about an angle range that is excluded from the range less than the angle Wt and that is preset in accordance with an aircraft type of the aircraft.

10. The passenger boarding bridge according to claim 1, wherein in a case where, in a plan view, an angle formed by an axis of the travel wheels, the angle being calculated clockwise with respect to the center line of the tunnel unit before undocking the cab from the aircraft, is an angle Wr, and in the plan view, an angle obtained by adding 90 degrees to an angle that is formed by a straight line and that is calculated clockwise with respect to the center line of the tunnel unit before undocking the cab from the aircraft is an angle Wt, the straight line extending along a distal end edge of the cab, the determiner is configured to perform the determination whether or not the travel direction of the backward travel of the travel wheels is a direction within the smooth undocking range based on whether or not the angle Wr is within an angle range that is set based on predetermined information within a range less than the angle Wt; and the predetermined information is information about an angle range that is excluded from the range less than the angle Wt and that is preset in accordance with an aircraft type of the aircraft.

11. The passenger boarding bridge according to claim 1, wherein in a case where, in a plan view, an angle formed by an axis of the travel wheels, the angle being calculated clockwise with respect to the center line of the tunnel unit before undocking the cab from the aircraft, is an angle Wr, and in the plan view, an angle obtained by adding 90 degrees to an angle that is formed by a fuselage guide line on an apron and that is calculated clockwise with respect to the center line of the tunnel unit before undocking the cab from the aircraft is an angle Wt, the determiner is configured to perform the determination whether or not the travel direction of the backward travel of the travel wheels is a direction within the smooth undocking range based on whether or not the angle Wr is within an angle range that is set based on predetermined information within a range less than the angle Wt; and the predetermined information is information about an angle range that is excluded from the range less than the angle Wt and that is preset in accordance with an aircraft type of the aircraft.

\* \* \* \* \*